United States Patent [19]

Curwen et al.

[11] 4,353,220

[45] Oct. 12, 1982

[54] RESONANT PISTON COMPRESSOR HAVING IMPROVED STROKE CONTROL FOR LOAD-FOLLOWING ELECTRIC HEAT PUMPS AND THE LIKE

[75] Inventors: Peter W. Curwen, Ballston Spa; Richard A. Dorman, Troy, both of N.Y.

[73] Assignee: Mechanical Technology Incorporated, Latham, N.Y.

[21] Appl. No.: 160,429

[22] Filed: Jun. 17, 1980

[51] Int. Cl.³ .................. F04B 49/06; F25B 41/04
[52] U.S. Cl. .................. 62/228; 417/22; 417/45; 417/53; 417/214; 417/416; 417/418; 417/440
[58] Field of Search .................. 417/416–418, 417/214, 218, 44, 45, 22, 440; 62/228 C; 91/165, 321; 92/10, 11, 134

[56] References Cited

U.S. PATENT DOCUMENTS

| | | | |
|---|---|---|---|
| 2,163,982 | 6/1939 | Mercier | 92/134 X |
| 2,807,215 | 9/1957 | Hawxhurst | 417/388 |
| 3,937,600 | 2/1976 | White | 417/416 |
| 4,067,667 | 1/1978 | White | 417/416 X |

*Primary Examiner*—Carlton R. Croyle
*Assistant Examiner*—Look Edward
*Attorney, Agent, or Firm*—Joseph V. Claeys; Charles W. Helzer; Arthur N. Trausch, III

[57] ABSTRACT

A method and apparatus for controlling a resonant piston compressor of the type comprising an electrodynamic linear reciprocating motor adapted to be driven cyclically by an alternating current power source and having at least one piston coupled to and adapted to be driven within a selectively valved working cylinder by the linear reciprocating motor in synchronism with the frequency of the alternating current power source. Enclosed volumes of gas act as resilient gas springs coacting with the piston and with the linear reciprocating motor to form a mechanical resonant system having a resonant frequency substantially centered on the frequency of the alternating current power source. A mid-stroke porting arrangement is responsive to the position of the resonant piston for selectively communicating a gas spring control valve with said gas springs. The invention operates to variably control with the gas spring control valve the pressure of the gas in the gas springs to thereby dynamically modulate the stiffness of the resilient gas spring in a manner to control the stroke of the resonant piston compressor within predetermined safe limits. The method and apparatus further include sensing a plurality of different operating parameters of the resonant piston compressor and deriving output sensed signals representative of the respective parameters, combining the sensed parameter output signals to derive therefrom an output control signal and applying the output control signal to the gas spring control valve to variably control the opening and closing of the gas spring control valve.

31 Claims, 2 Drawing Figures

RESONANT PISTON COMPRESSOR HAVING IMPROVED STROKE CONTROL FOR LOAD-FOLLOWING ELECTRIC HEAT PUMPS AND THE LIKE

BACKGROUND OF INVENTION

1. Field of Invention

This invention relates to a new and improved resonant piston compressor having an improved piston stroke control and to a heat pump apparatus utilizing such compressor.

More particularly, the invention relates to a resonant free-piston variable stroke compressor having improved means for controlling the stroke of the resonant piston compressor (RPC). In RPC's, the spring-mass system of the resonant free-piston is forced into vibration by the armature of a linear reciprocating motor with the armature being connected to and comprising part of the spring-mass system of the resonant free-piston, the entire subassembly being referred to hereinafter as the plunger. The plunger generally comprises at least one piston-armature adapted to be driven within a selectively valved working cylinder by the linear motor in synchronism with the frequency of an AC power source used to drive the linear motor. Enclosed volumes of gas acting as resilient gas spring means coact with the plunger assembly to form a mechanical resonant system having a resonant frequency centered on the frequency of the AC power source. In the present invention, improved means are provided for controlling the power output of the linear motor and plunger assembly by varying the resonant frequency of the mechanical resonant system to increase the resonant frequency by increasing the stiffness of the resilient gas spring means in response to increasing piston stroke, and decreasing the resonant frequency by decreasing the stiffness of the resilient gas springs in response to decreasing piston stroke.

2. Background of Invention

A controlled stroke, resonant free-piston compressor employing an electrodynamic linear motor is described and claimed in the U.S. Pat. No. 3,937,600 issued Feb. 10, 1976 to Harlan V. White—Inventor and entitled, "Controlled Stroke Electrodynamic Linear Compressor"—assigned to Mechanical Technology Incorporated. An improved control system for use in conjunction with the present invention is described in copending U.S. application Ser. No. 160,305, Richard A. Dorman—Inventor, filed June 17, 1980 concurrently with this application, now U.S. Pat. No. 4,291,258 and entitled, "Control System for Resonant Free-Piston Variable Stroke Compressor for Load-Following Electric Heat Pumps and the Like," assigned to Mechanical Technology Incorporated. A further improved controlled stroke, resonant free-piston compressor with which the present invention and control system described in copending U.S. application Ser. No. 160,305, can be used as described in U.S. Pat. No. 4,067,667 for a "Control Stroke Electrodynamic Oscillating Motor Compressor," Harlan V. White—Inventor also assigned to Mechanical Technology Incorporated of Latham, New York. The disclosures of each of these prior art reference United States patents and copending application, are hereby incorporated in their entirety into this application. RPC heat pumps, for the purpose of this disclosure, are defined as load-following (modulating) heat pumps where the words "load-following" or "modulating" mean that the output heating or cooling capacity of the heat pump is varied in a substantially continuous manner so that its output capacity matches the actual instantaneous heating/cooling load requirement. For example, if the load is a single-family residence where the heating or cooling requirements vary as a function of outdoor weather conditions, the heating or cooling capacity of an RPC heat pump automatically will be smoothly varied (modulated) to maintain the temperature of the house at a desired temperature set by a thermostat control within the house. As a consequence of its load-following capabilities, the RPC heat pump will operate more or less continuously. This is in sharp contrast to the on-off cycling type of operating characteristic of most currently available (non-modulating) heat pumps. It has been determined, as a result of the above briefly described experience, that the modulating mode type of heat pump operation is more energy efficient than on-off cycling and can result in significant kilowatt-hour savings (operating cost savings) for the home owner having an RPC heat pump installation.

The RPC heat pump modulating capability is attained by means of a unique linear reciprocating motor-driven resonant free-piston compressor. To obtain the continuously variable output capability, the displacement (stroke) of the RPC is changed or varied, and hereinafter will be referred to as stroke control or stroke modulation.

Studies have indicated that by providing a control capability for continuously adjusting piston stroke (stroke modulation), RPC-equipped heat pumps should yield significant energy savings and fast pay back of installed cost premiums. Compared to the best residential heat pumps concurrently available (those heat pumps with constant-displacement compression operating in an on-off cycling mode), the advantages of a continuously variable modulation RPC heat pump predictably include a 19%–34% reduction in annual operating costs for the owner; depending upon geographic location, a 2.2 years or less pay back time on installed cost premiums, again depending upon geographic location; higher inherent reliability resulting from RPC tolerance to liquid refrigerant flood back and greatly reduced number of heat pump on-off and defrost cycles as a consequence of the continuous modulation capability, and; lower maintenance and repair costs due to reduced stress on components as a consequence of the stroke modulation control capability in constrast to the higher stress on-off cycling used in conventional heat pumps.

In order to take full advantage of the stroke-modulation capability inherent in the RPC as described in the above-listed patents, it was desirable to provide a better means for controlling (modulating) the resonant free-piston stroke of the compressor over a relatively wide range of outdoor temperatures. For this purpose, the present invention was devised.

SUMMARY OF INVENTION

It is therefore a primary object of the invention to provide a new and improved resonant piston compressor having an improved stroke control and a heat pump apparatus utilizing such compressor.

Another object of the invention is to provide an RPC having an improved stroke control for controlling automatically the stroke modulation of the RPC. The spring-mass system of the resonant free-piston within the RPC is forced into vibration by a linear motor, and is designed to have a selectively variable mechanical resonant frequency generally centered on the AC power line frequency of an AC power source used to drive the linear motor. The RPC of this invention may also include improved means responsive to any overstroking of the compressor piston which are operative to vary the natural frequency of the spring-mass system by varying the stiffness of resilient gas spring volumes comprising a part of the RPC.

Still another object of the invention is to provide an RPC having an improved stroke modulation control which is suitable for incorporation in an overall heat pump apparatus and the provision of such overall heat pump apparatus employing the RPC having improved stroke modulation control.

A further object of the invention is to provide an improved RPC heat pump having the above characteristics which include in addition a two voltage level control for extending the output power range of the RPC in an overall heat pump.

A feature of the invention is the provision of an RPC having an improved stroke modulation control. The RPC comprises an electrodynamic linear reciprocating motor adapted to be driven cyclically by an AC power source. At least one piston is coupled to and adapted to be driven within a selectively valved working cylinder by the linear motor armature in synchronism, with the frequency of the AC power source. Enclosed volumes of gas comprising resilient gas spring means coact with the resonant free-piston and with the linear motor to form a mechanical spring-mass resonant system having a resonant frequency substantially equal to the frequency of the AC power source. Means are provided within the RPC which are responsive to the position of the piston for controlling the power output of the linear motor to thereby provide stable operation over varying compressor load conditions by varying the resonant frequency of the said spring-mass mechanical resonant system, increasing the resonant frequency by increasing the stiffness of the resilient gas spring means and decreasing the resonant frequency by decreasing the stiffness of the resilient gas spring means.

Another feature of the invention is the provision of a gas spring control valve means for controlling compressor stroke through regulation of the gas pressure of the resilient gas spring means. The gas spring control valve means in turn is controlled by a control circuit that includes AC current sensing means for deriving a sensed signal representative of the magnitude and phase of the alternating current supplied to the linear reciprocating motor of the RPC. Since this is a constant frequency machine, the magnitude of displacement, velocity and acceleration are proportional but differ in phase. Thus, either of such parameters may be utilized. In the system described in detail herein a displacement-/velocity sensor is provided for deriving a signal representative of the RPC piston velocity. An $\alpha$ angle detector is provided which is responsive to the output from the AC current sensor and the piston velocity sensor for comparing the phase of the AC current supplied to the linear reciprocating motor to the piston displacement-/velocity and deriving an output $\alpha$ angle control signal used to derive motor control voltage signals that control the magnitude of the voltage supplied to the AC coils of the linear reciprocating motor. The $\alpha$ angle control signal is representative of whether the undamped natural frequency of the resonant free-piston and the AC supply voltage frequency to the linear reciprocating motor are the same, or whether they differ, and in which direction. By appropriately controlling the opening and closing of the gas spring control valve means for the stiffness of the gas spring means is controlled to thereby control the piston stroke. The control system also maintains the $\alpha$ angle at a desired value between predetermined safe limits during operation of the RPC.

Another feature of the invention is the provision of an RPC utilizing a linear reciprocating electrodynamic motor which includes AC windings and DC field windings. The control system employed in controlling the RPC includes AC voltage control means for controlling the magnitude of the AC voltage supplied to the AC windings, AC current detector means responsive to the output from the AC current sensor for deriving an output signal representative of the AC current. The output from the AC detector is supplied to an RPC control logic circuit for deriving a DC current for application to the DC field winding of the linear motor which is proportional to the magnitude of the AC current supplied to the AC windings of the motor.

A further feature of the invention is the provision in the control system for the RPC of a two level voltage supply relay circuit for controlling the magnitude of the supply AC voltage to the linear reciprocating motor. The motor voltage relay circuit is controlled by the RPC control logic circuit in response to outputs from the $\alpha$ angle detector whereby the AC supply voltage to the linear reciprocating motor is switched from a lower (115 volt rms) to a higher (230 volt rms) value upon the $\alpha$ angle attaining a predetermined negative (lagging) value under conditions where the natural mechanical RPC system resonant frequency is lower than the alternating current supply voltage frequency and for switching the AC voltage to the linear motor to a lower (115 volt rms) value in response to the $\alpha$ angle attaining a predetermined positive (leading) value relative to the AC supply voltage frequency.

In addition to the above features, a stroke limit protective circuit and a motor temperature protection circuit also are included for assuring that the operation of the RPC is maintained within piston stroke and motor temperature limits which assure that the RPC will not be damaged during operation.

BRIEF DESCRIPTION OF DRAWINGS

These and other objects, features and many of the attendant advantages of this invention will become better understood from a reading of the following detailed description when considered in connection with the accompanying drawings, wherein like parts in each of the several figures are identified by the same reference character, and wherein.

DETAILED DESCRIPTION OF PREFERRED EMBODIMENT

Figure 1:
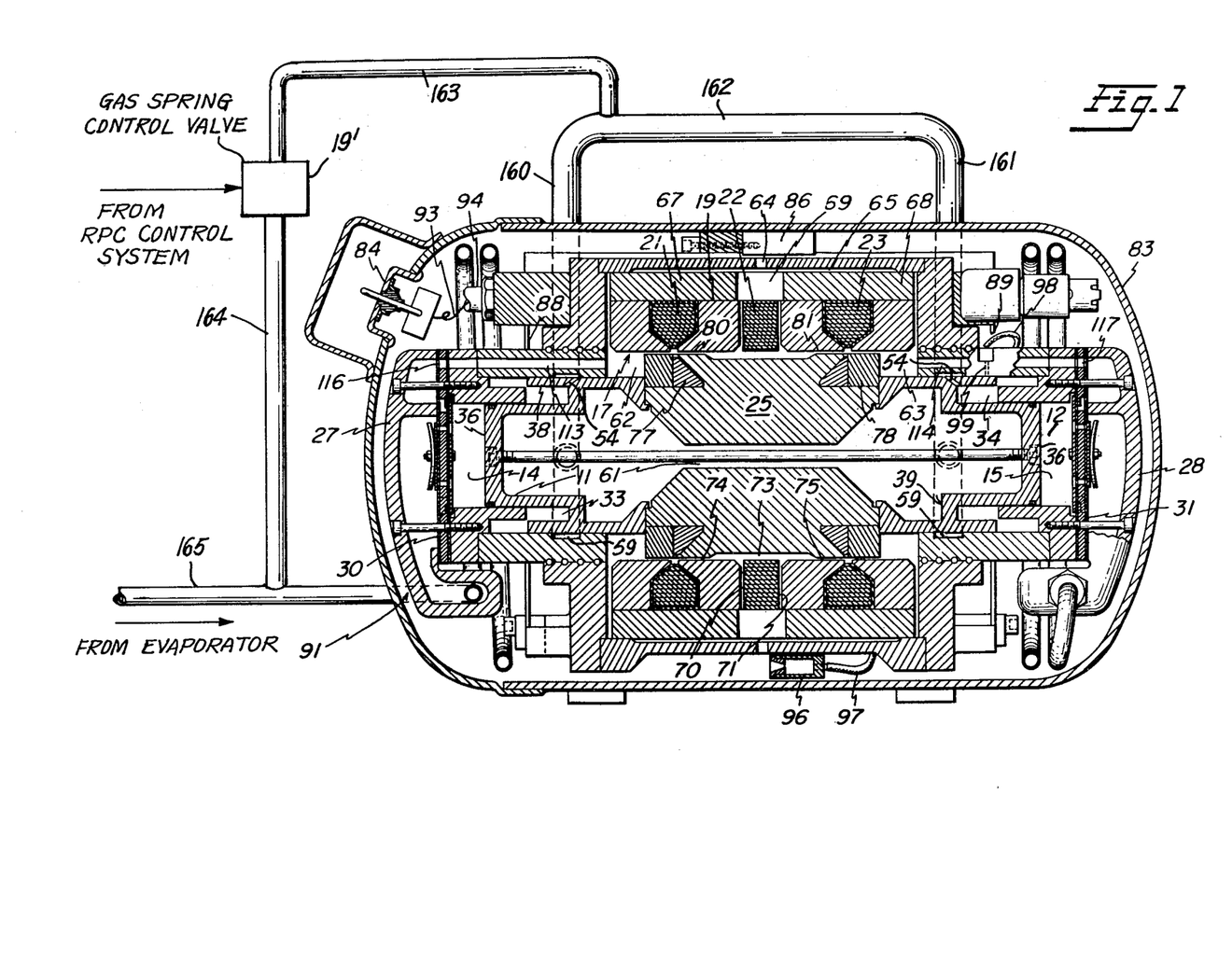
FIG. 1 is a longitudinal sectional view of a new and improved resonant piston compressor having improved stroke control and constructed in accordance with the present invention.

FIG. 1 is a longitudinal sectional view of an improved resonant piston compressor having improved stroke modulation control constructed in accordance with the invention. For a more detailed description of the construction and operation of the basic components of the RPC shown in FIG. 1, reference is made to U.S. Pat. No. 4,067,667, noted above. However, for the purpose of the present disclosure, the following brief description will be provided of the essential coacting parts of the RPC in order that a full appreciation of the merits of the present invention will be obtained from a reading of this document.

The RPC includes a pair of oppositely directed pistons 11 and 12, each comprising a working plunger 36 and radially spaced apart gas spring plungers 38. The working plungers 36 of pistons 11 and 12 are disposed within respective working cylinders 14 and 15 and gas spring plungers 38 are disposed in respective gas spring cylinders 33 and 34. The pistons 11 and 12 are interconnected with and reciprocately driven by the armature 25 of an electrodynamic linear reciprocating motor shown generally at 17. The working plungers 36, gas spring plunger 38 and armature 25 of linear motor 17 form a plunger assembly which is reciprocated within the working cylinders 14 and 15 at a frequency centered about an AC supply voltage frequency of the AC power source for supplying AC windings 21 and 23 of the linear reciprocating motor. The motor also includes DC field windings 22.

During operation, the working plungers 36 are slidably reciprocal in the working cylinders 14 and 15, respectively. The gas spring cylinders 33 comprises two chambers, a first chamber defined by an L-shaped annular recess in the working cylinder wall member and a gas spring cylinder wall member. A second chamber is defined by the inside wall of the gas spring plunger 38 and the outside wall of the working plunger 36. Gas spring plungers 38 reciprocate in the first chamber and the working cylinder wall member reciprocates in the second chamber. The gas spring wall member 38 is provided with a plurality of circumferentially spaced apart ports 54 extending through the gas spring cylinder wall member and which communicate the gas spring cavities 33 and 34 with a circumferentially arranged groove 59 with the piston assembly is in its mid-stroke position. The displacement is such that the gas spring cylinders at each end of the plunger assembly simultaneously align their spaced apart ports 54 with the circumferential groove 59 at mid-stroke whereby both gas spring cylinders communicate through the ports 54 with circumferential groove 59, and through passageways 160 and 161 with a control pressure manifold shown at 162. The manifold 162 is connected by a line 163 to a gas spring control valve means 19 having its inlet end connected to passageway 163 and its outlet or discharge end connected to an outlet passageway 164 connected back to the input conduit 165 from an evaporator or like apparatus that comprises the inlet or suction to the input of the RPC. The gas spring control valve means 19 is thus selectively communicated with the gas spring means via the manifold 162 and ports 54. The construction of the gas spring control value means 19 is described more fully in copending U.S. application Ser. No. 160,317, filed June 17, 1980 concurrently with this application and entitled, "Improved Gas Pressure Regulator Valve" by Leo Hoogenboom, assigned to Mechanical Technology Incorporated. From this description, it will be appreciated that with the plunger assembly in its mid-stroke position, the resilient gas spring volumes 33 and 34 will communicate through the ports 54, circumferential grooves 59 and passageways 160 and 161 at each end of the plunger assembly with the manifold 162. Thus, at the mid-stroke position of the plunger assembly, the gas pressure in each of the resilient gas spring volumes 33 and 34 will be equalized to the pressure of the manifold 162. The pressure of the gas in the manifold 162 in turn will be determined by the opening and closing of the gas spring control valve means 19 for thereby regulating (modulating) the pressure of the gas in the gas spring volumes 33 and 34 at each end of the plunger assembly. This arrangement is in contrast to the particular RPC described in U.S. Pat. No. 3,937,600 wherein a second set of circumferential ports were provided to interconnect the circumferential groove 59 with the interior of the hollow piston assembly thereby assuring equalization of the pressure in the resilient gas spring volumes 33 and 34 at the mid-stroke position of the plunger assembly.

Over-stroking compensation for the RPC shown in FIG. 1 may be provided identical to that of the RPC described in U.S. Pat. No. 3,937,600. The over-stroking compensation is provided by the circumferential ports 54 which communicate the gas spring cavities 33 and 34 with the interior of the housing 83 which comprises a reservoir of higher pressure gas upon the occurrence of an over-stroked position at either end of the stroke. This results in immediately admitting gas at a higher ambient pressure to the respective gas spring cylinders 33 and 34 thereby increasing the stiffness of the resilient gas springs, resulting in an increase in the resonant frequency of the resonant piston assembly and limiting the stroke. Thereafter, during the next successive oscillation of the plunger assembly, the circumferentially arranged ports 54 will equalize the resilient gas spring volumes 33 and 34 with the pressure in the exhaust manifold 162 as described in the preceding paragraph. Since the interior of the housing in the particular arrangement described herein is at a high pressure, there is a natural leakage into the gas spring volumes 33 and 34 to thereby increase the gas pressure in such gas spring volumes. If because of loading condition, etc., it is determined that this pressure becomes too high, the control system described hereinafter with relation to FIG. 2 of the drawings will cause the gas spring control valve means 19 to incrementally open for a predetermined period to finely adjust the pressure in manifold 162 and thereby regulate the pressure of the gas in the resilient gas spring means to a desired value required to meet the increased or decreased load on the compressor. As described more fully in the above-mentioned patent application Ser. No. 160,305, the gas spring control valve means 19 is opened fully for discrete intervals of time either on a constant rate basis with variable duty cycle, or on a variable rate basis with constant duty cycle, or is maintained closed to thereby maintain the pressure of the gas in manifold 162 and hence the resilient gas spring volumes 33 and 34 at optimized values called for by the associated control circuit that controls the opening and closing of gas spring valve means 19.

It will be understood that although in the foregoing described arrangement the interior of the housing 83 is at a high pressure so that leakage is into the gas spring volumes 33 and 34, the compressor could be arranged if desired with the interior of the housing 83 at a low pressure so that leakage would be out of the gas spring volumes 33 and 34. If the latter arrangement is employed then the gas spring control valve means 19 would be operative to increase the pressure in such gas spring volumes.

In any practically constructed and competitively priced resonant piston compressor having the above-described features, it is anticipated that the manufacturing clearances provided between the reciprocating plunger assembly and the stator portion of the resonant piston compressor will be such that a certain amount of leakage will take place between higher pressure spaces and the enclosed volumes which in this arrangement are normally maintained at lower pressure. Such a condition will exist, for example, with respect to the higher pressure gas within the interior of housing 83 and the enclosed volumes 33 and 34 comprising the gas spring means. It should be noted, however, that the anticipated leakage is in the direction of safety since it tends to increase the stiffness of the resilient gas springs and therefor reduce the piston stroke. Further, the system is designed to make use of such leakage by constructing the control pressure manifold 162 so that it can handle any increased flow out of the gas spring volumes 33 and 34 due to wear, and by appropriate adjustment of the gating of the gas spring control valve means 19 such that the increased gas flow through the gas spring means is provided for.

Figure 2:
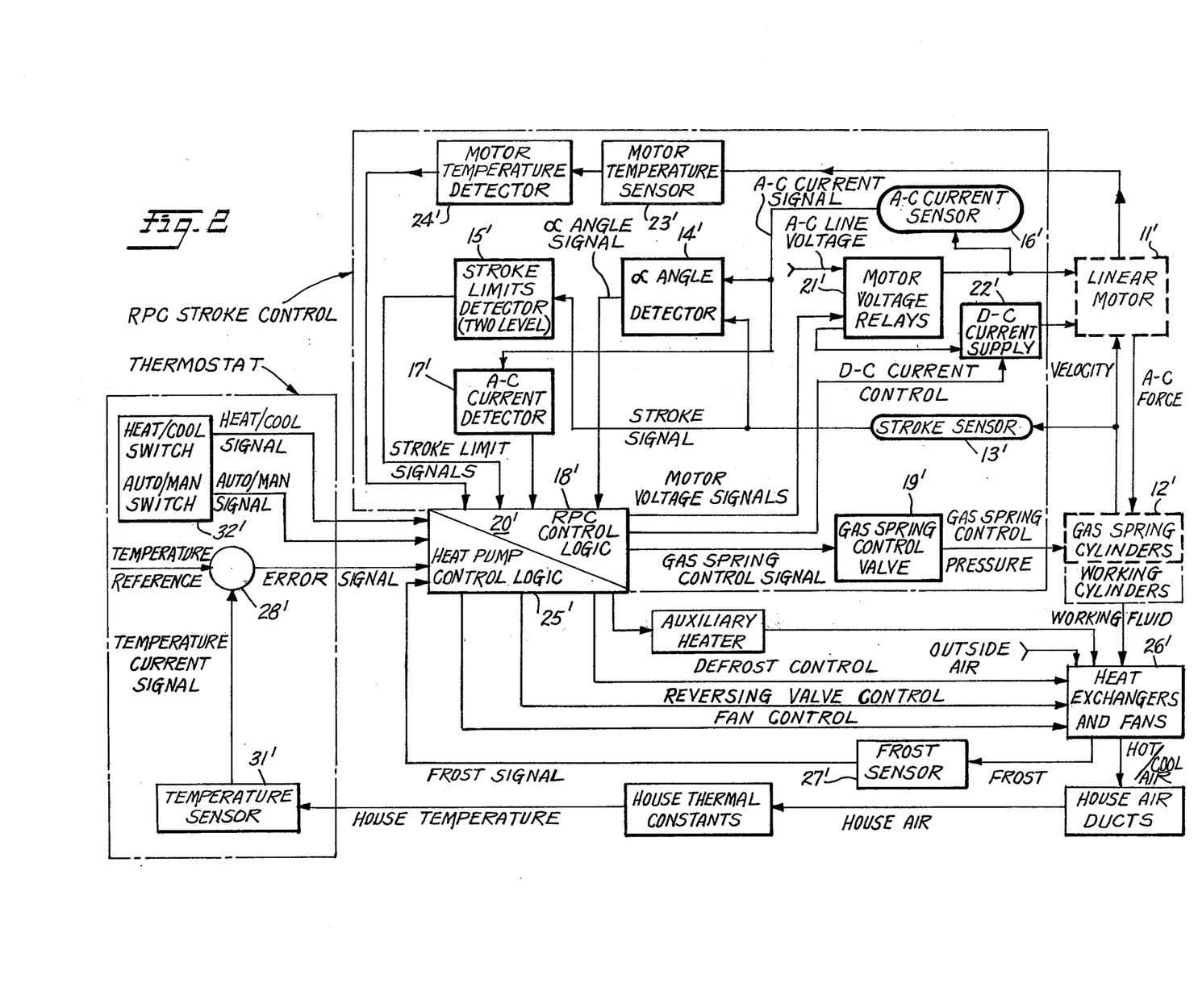
FIG. 2 is a functional block diagram of an RPC heat pump control system usable with the improved RPC shown in FIG. 1 in a heat pump apparatus.

FIG. 2 is a detailed functional block diagram of an RPC control system designed for use with the improved RPC shown in FIG. 1 and in particular where the RPC is used as the compressor for a heat pump apparatus. As described in the preceding paragraphs, the RPC includes means for varying the natural frequency of the spring-mass resonant plunger system by varying the stiffness of the enclosed volumes of gas comprising the gas spring means of the RPC. For this purpose, means are provided for controlling the power output of the linear motor to thereby provide stable operation over varying compressor load conditions by varying the resonant frequency of the spring-mass resonant piston assembly. This means includes a stroke sensor shown at 13 in FIG. 2 which in effect derives an output electric signal representative of the displacement/velocity of the resonant piston. This stroke signal is supplied as one input to an α angle detector circuit 14 as well as to a stroke limits detector 15 whose purpose will be described more fully hereafter. The stroke sensor 13 is shown as being coupled to the gas spring cylinders indicated generally by dotted outline box 12 driven by the linear motor shown generally by dotted outline box 11. An AC current sensor 16 is coupled to the AC supply lines to linear motor 11 for deriving an output AC current signal that is supplied as a second input to the α angle detector circuit 14. The AC current signal also is supplied as an input to an AC current detector 17. Using the piston stroke velocity signal from sensor 13 in conjunction with the AC current signal obtained from AC current sensor 16, the α angle detector circuit 14 derives an output α angle control signal. This output α angle control signal then is supplied to an RPC control logic circuit shown as the right upper triangular portion of a main controller 20 which further includes a heat pump control logic circuit 25 indicated in the lower left triangular portion of box 20. The RPC control logic circuit 18 then derives motor voltage control signals that are supplied to the motor control relays shown at 21 for controlling the voltage value to the AC coils in the linear motor 11.

For a more detailed description of the components of the RPC control system shown in FIG. 2, reference is made to copending U.S. application Ser. No. 160,306, entitled "Resonant Piston Compressor Heat Pump Control System" by Richard A. Dorman-Inventor filed concurrently with this application, now Pat. No. 4,345,442 and assigned to Mechanical Technology Incorporated. Briefly however, it can be stated that the system components including stroke sensor 13, AC current sensor 16, α angle detector 14, the RPC control logic circuit 18 and the gas spring control valve means 19 comprise a control system that constitutes the main operating control for the RPC so as to provide stable operation for the RPC over varying compressor load conditions. This control system accomplishes its controlling function by increasing the resonant frequency of the spring-piston mass system by increasing the stiffness of the gas spring means, and decreasing the resonant frequency of the spring-piston mass system by decreasing the stiffness of the resilient gas springs. During operation of the RPC, the natural (resonant) frequency of the spring-piston mass system is designed to be nearly equal to the frequency of the AC voltage applied to the linear motor. This permits the smallest possible motor to be designed since, at resonance, the motor is not required to supply the large acceleration forces required to sustain reciprocating motion of the armature-piston plunger assembly. The required acceleration forces are provided mainly by the gas-spring cylinders with a smaller contribution by the working cylinders of the compressor.

The phase angle α is defined as the phase shift between the motor AC current and the motor back EMF. This same phase angle exists in the RPC spring-piston mass system and represents the phase shift between the electromagnetic force acting on the motor armature and the piston assembly velocity. When the natural (resonant) frequency of the RPC and the frequency of the AC voltage applied to linear motor 11, are equal, the phase angle α is zero. When the natural frequency is higher than the AC voltage frequency, the angle α is positive and is said to be leading. When the natural frequency of the spring-piston mass system is lower than the AC voltage frequency, the α angle is negative and said to be lagging.

In addition to controlling the output power developed by the RPC by regulating the gas-spring stiffness, the output power of the RPC also is varied by changing the AC voltage magnitude applied to linear reciprocating motor 11. Both methods of power control are used in the RPC control system shown in FIG. 2. For this purpose, the RPC control logic circuit 18 is programmed to monitor the α angle as determined by an α angle detector 14 and derives a motor voltage signal that is applied to a set of motor voltage relays 21 of conventional construction. In the arrangement described herein, the motor voltage relays 21 serve to couple either a 230 volt rms value AC line voltage or a 115 volt rms value AC line voltage to the AC windings of linear motor 11 in response to the motor voltage control signal supplied from the RPC control logic circuit 18. By this means the AC voltage supplied to motor 11 is switched between the 115 volt or 230 volt levels depending upon whether low or high power operation is called for. This variation in voltage level in conjunction with the regulation of the pressure of the gas spring means to achieve the stroke modulation described earlier, is used to obtain continuous modulation of compressor output power over a wide range of output power values.

In addition to the AC current supplied to the AC coils, DC current is supplied to DC field windings of linear motor 11 from a DC current supply circuit shown at 22 in FIG. 2. The DC current supply circuit 22 is controlled by a DC current control signal supplied from the RPC control logic circuit 18 for proportionally controlling the magnitude of the DC current supplied to the DC field windings of linear motor 11 in proportion to the magnitude of the AC current supplied to the AC field windings of the motor. For this purpose, the DC current supply circuit 22 includes a rectifier and SCR chopper circuit for appropriately controlling the magnitude of the DC current as described more fully in copending U.S. application Ser. No. 160,305, filed June 17, 1980 concurrently with this application and entitled, "DC Excitation Control of Linear Oscillating Motors" by Howard L. Clark, Richard A. Dorman and Paul Back, Inventors, and assigned to Mechanical Technology Incorporated. For a more detailed description of the DC current supply circuit 22 and the manner of its operation, reference is made to copending application Ser. No. 160,305. However, for the purpose of the present disclosure it is sufficient to state that the DC control signal from RPC control logic circuit 18 proportionally controls the magnitude of the DC current supplied to the DC field windings of linear motor 11 in proportion to the magnitude of the AC current supplied to the AC windings of the motor. For this purpose, the AC current sensor 16 supplies its output to AC current detector 17. AC current detector 17 supplies its output to the RPC control logic circuit 18 for use in deriving the desired DC current control signal used in proportionally controlling the DC current value.

In addition to the above-described main control loops, the RPC control circuit of FIG. 2 further includes safety circuit features which monitor the temperature of the linear reciprocating motor 11 and the length of stroke of the resonant free-piston. In the event the piston stroke exceeds the maximum limit, the output power of the compressor is maintained, and in the conditions of minimum piston stroke or excessive motor temperature, the compressor is shut down entirely. For this reason, a motor temperature sensor 23 is provided for sensing the temperature of the linear reciprocating motor 11 and supplies its output to a motor temperature detector circuit 24. Motor temperature detector circuit 24 compares the sensed motor temperature to a predetermined temperature limit value representing a shut-down level, and provides an output motor temperature control signal to the RPC control logic circuit 18. In addition to the motor temperature safety feature, a stroke limit detector circuit 15 is provided which is supplied the output signal from the stroke sensor 13. The stroke limit detector 15 compares the instantaneous value of the magnitude of the stroke of the resonant free-piston between two predetermined levels, and derives output stroke control signals for supply to the RPC control logic circuit 18. Logic circuit 18 then processes the motor temperature shut-down signal together with the stroke control signals and in response thereto either maintains the output power of the compressor, shuts down the compressor because of a minimum stroke condition, or shuts down the compressor for temperature safety purposes and signals the homeowner of the condition.

The RPC having improved stroke control constructed according to the present invention is designed to operate as a load-demand following system for supplying the heating/cooling load demands of a heat pump unit under almost all operating conditions. However, where a response to the load demand would endanger the RPC, its operation is monitored and maintained within safe limits by the essentially self-contained RPC control system described above. The improved RPC having improved stroke control preferably is employed as an integral part of an overall heat pump apparatus having a central controller 20 which includes both the RPC control logic circuit 18 and a heat pump control logic circuit 25 for controlling overall operation of the heat pump components including the RPC. The RPC supplies working fluid to the heat exchanger 26 of the heat pump unit. The central controller 20 may comprise a conventional, commercially available microprocessor based system of the type manufactured and sold by Borg Warner Corporation or Honeywell, Inc. which is specifically designed for use in controlling operation of heat pump units and other similar apparatus. The heat pump control logic circuit portion 25 of controller 20, in addition to controlling the heat pump unit components supplies an input operating set point reference signal to the RPC control logic 18 for coordinating operation of the RPC with other components of the heat pump unit. In addition, heat pump control logic circuit 25 supplies a defrost control signal, a reversing valve control signal and a fan control signal to the heat exchanger and fans 26 and receives back from a frost sensor 27 a frost signal input for determining the point at which a defrost operating mode should be imposed on the heat exchangers.

The main operating or modulating control signal for controlling the RPC is a temperature error signal supplied from a comparator circuit 28 which comprises a part of a thermostat unit shown by the dashed line box 29. The comparator circuit 28 is supplied a temperature reference input set by manual operation of a rheostat or the like by the owner of the house or other operator of the heat pump apparatus. In addition, a sensed temperature signal is derived by a temperature sensor 31 which measure the actual house temperature at particular points after integrating heating/cooling losses incurred by the house or other space, air ducting and other thermal constants. The comparator circuit 28 compares the sensed actual temperature of the house with the reference temperature and derives an output house temperature error signal representative of any difference between the two and the polarity of the difference. The heat pump control logic circuit 25 then processes the error signal and supplies appropriate output controlling signals to the RPC and/or heat exchanger and fans 26 to cause the heat pump to reduce the temperature error signal towards zero.

In addition to the above features, a manually operated heat/cool switch and automatic/manual switch 32 are provided on the thermostat as is known in the heating/cooling art. These switches cause the heat pump control logic circuit 25 to actuate the reversing valve of the heat exchangers to cause the RPC heat pump unit to either heat or cool as required by the setting of the heat/cool switch. The setting of the automatic/manual switch determines whether the RPC heat pump will operate in the automatic mode during either a heating or cooling cycle as set by the heat/cool switch or whether the heat exchanger and RPC will be de-energized and only the circulating fans operated to cause circulation of air through the house or other space being cooled as is well known in conventional heat pump installations.

As mentioned earlier, the RPC heat pump unit constitutes a load-following (modulating) heat pump. By this is meant the output heating or cooling capacity of the RPC heat pump is varied in a continuous manner so that its output capacity matches the actual load requirement. Where the load is a single family residence to be heated or cooled, and the load varies as the function of outdoor weather conditions, the heating or cooling capacity of the RPC heat pump unit automatically will be smoothly varied (modulated) to maintain the temperature of the house at the thermostat reference temperature setting. As a consequence of these load-following operating characteristics, the RPC heat pump operates more or less continuously to maintain the residence at the desired temperature setting. This is in sharp contrast to the on-off cycling mode of operation utilized by most currently available (non-modulating) heat pumps.

From the foregoing description it will be appreciated that the present invention provides a new and improved resonant free-piston variable stroke compressor having improved stroke control modulation and a new and improved RPC heat pump utilizing such compressor. The novel system controls automatically the stroke modulation of the mechanical, resonant free-piston compressor driven by an electrodynamic linear reciprocating motor wherein the spring-plunger mass system of the resonant free-piston is forced into vibration within a valved cylinder. The improved RPC heat pump is designed to have a selectively variable mechanical resonant frequency generally centered on the power line frequency of the AC power source used to drive the linear motor. The RPC includes means which are operative to vary the natural frequency of the spring-plunger mass system by varying the stiffness of the resilient gas spring means of the RPC. Also, by changing the magnitude of the AC voltage supplied to the linear motor upon detection of the phase angle α above or below preselected limits, continuous modulation of the RPC heat pump output capacity is obtained over a wide range of outdoor temperature values in contrast to the conventional on-off type control employed in current, commercially available heat pumps.

Having described a preferred embodiment of an improved RPC heat pump having improved stroke control constructed in accordance with the present invention, other modifications, variations and changes will occur to those skilled in the art in the light of the above teachings. It is therefore to be understood that all such modifications, variations and changes are believed to embody the true spirit and scope of the invention as defined by the appended claims.

What is claimed is:

1. In a resonant piston apparatus wherein a movable mass is arranged with gas spring means and an oscillating driving means to form a dynamic ocillating system, the combination with such apparatus comprising:
   dynamically variable gas spring control valve means communicating with said gas spring means for regulating the pressure of the gas in said gas spring means, and control means for dynamically variably controlling the opening and closing of said gas spring control valve means during operation of the oscillating system to thereby maintain the operation of said oscillating system within predetermined stroke limits and to dynamically variably modulate the stroke of the oscillating system to meet load demands.

2. A resonant piston compressor of the type comprising an electrodynamic linear reciprocating motor adapted to be driven cyclicly by an AC power source, at least one piston coupled to and adapted to be driven within a selectively valved working cylinder by said linear motor in synchronism with the frequency of the AC power source, enclosed volume of gas acting as resilient gas spring means coacting with said piston and with said motor to form a dynamic mechanical resonant oscillating system having a resonant frequency substantially equal to the frequency of said AC power source, the improvement comprising:
   dynamically variable gas spring control valve means selectively communicating with said gas spring means for regulating the pressure of gas in said gas spring means, and control means for dynamically variably controlling the opening and closing of said gas spring control valve means during operation of the oscillating system to thereby maintain the operation of said resonant piston compressor within predetermined stroke limits and to variably modulate the piston stroke in response to load demands placed on the compressor.

3. A resonant piston compressor according to claim 2 wherein said control means includes a number of operating parameter sensors for sensing a plurality of different operating parameters of the resonant piston compressor and deriving output sensed signals representative of the respective parameters, means for combining the sensed parameter output signals to derive therefrom output control signals and means for applying said output control signals to variably control the opening and closing of said gas spring control valve means.

4. A resonant piston compressor according to claim 3 wherein said control means includes alternating current sensing means for deriving a sensed output signal representative of the amplitude and phase of the alternating current supplied to the linear reciprocating motor, piston displacement/velocity sensing means for deriving a signal representative of the resonant piston velocity, said means for combining the sensed parameter output signals including α angle detector means responsive to the output from the alternating current sensing means and the piston displacement/velocity sensing means for comparing the phase of the alternating current supplied to the linear reciprocating motor to the resonant piston velocity and deriving an output α angle control signal used to derive motor voltage control signals that control the magnitude of the voltage supplied to the A-C coils of the linear reciprocating motor.

5. A resonant piston compressor according to claim 4 further including resonant piston compressor control logic means responsive to the α angle control signal derived by said α angle detector means and also responsive to a number of additional resonant piston compressor operating parameter sensing means for logically processing said α angle control signal together with the other sensed parameter output signals derived by said additional operating parameter sensing means and overall controlling both the gas spring control valve means and the linear reciprocating motor voltage.

6. A resonant piston compressor according to claim 5 wherein said linear reciprocating electrodynamic motor includes alternating current winding means and direct current field winding means and said feedback control circuit means further includes alternating current voltage control means for controlling the magnitude of the alternating current voltage supplied to the alternating current winding means, alternating current detector means responsive to the output from said alternating current sensing means for deriving an output feedback signal representative of the magnitude of the alternating current, the output from said alternating current detector circuit means being supplied to said resonant piston compressor control logic means and direct current control and supply circuit means having its output coupled to the field winding means of the reciprocating linear motor and controlled by an output direct current control signal derived from said resonant piston control logic means for proportionally controlling the magnitude of the direct current supplied to said linear reciprocating motor field winding in proportion to the current magnitude of the alternating current supplied to the alternating current winding means of the linear reciprocating motor.

7. A resonant piston compressor according to claim 6 wherein said direct current control and supply circuit means further includes two level voltage supply relay circuit means for controlling the magnitude of the supply alternating current voltage to said linear reciprocating motor, said motor voltage relay circuit means being controlled by the resonant piston compressor control logic means in response to the $\alpha$ angle detector means and the alternating current detector means whereby the magnitude of the alternating current supply voltage to the linear reciprocating motor is switched from a lower voltage to a higher voltage value upon the $\alpha$ angle attaining a predetermined negative (lagging) value under conditions where the natural mechanical RPC system resonant frequency is lower than the alternating current supply voltage frequency and for switching the alternating current voltage to the linear reciprocating motor to a lower voltage value in response to the $\alpha$ angle attaining a predetermined positive (leading) value relative to the alternating current supply voltage frequency.

8. A resonant piston compressor according to claim 7 further including two level stroke limit detector circuit means responsive to the output from said resonant piston displacement/velocity sensing means for comparing the resonant piston velocity to two predetermined limit magnitudes, the output from said two level stroke limit detector circuit means being supplied to said resonant piston compressor control logic means for providing the maintaining of piston stroke or to shutting down of the operation of the resonant piston compressor under conditions where the piston stroke magnitude attains levels which could cause inefficient compressor operation or could result in damage to the compressor.

9. A resonant piston compressor according to claim 8 further including motor temperature sensing means for sensing the temperature of the linear reciprocating motor and deriving an output sensed temperature signal representative of the temperature value, and motor temperature detector circuit means responsive to the output motor temperature signal for comparing the sensed motor temperature to predetermined safe temperature limit and deriving an output motor temperature alarm signal for supply to said resonant piston control logic means to cause said resonant piston control logic means to shut down the compressor in the event that the motor temperature exceeds a predetermined safe limit value.

10. A resonant piston compressor according to either of claims 1, 2, 3, 4, 5, 6, 7, 8 or 9 further characterized by means communicating said gas spring means with a reservoir of gas at high pressure.

11. A resonant piston compressor according to claim 9 wherein said compressor is part of a larger overall apparatus for performing a predetermined design function and the larger overall apparatus includes a central apparatus controller for supplying to the resonant piston control logic means an input demand control reference signal for controlling the operating set point for the resonant piston compressor in response to the requirements of the apparatus.

12. An apparatus according to claim 11 wherein the apparatus comprises a heat pump unit including heat exchanger means for dispensing heated/cooled air for maintaining the temperature of a climate controlled space within desired values, said heat exchange means being supplied working fluid from the resonant piston compressor along with outside air to be heated/cooled, the central controller of the apparatus comprising a heat pump control logic circuit means for supplying operating control signals to the components of the heat pump, thermostat means including means for providing a temperature reference signal representative of a desired temperature at which the space being heated/cooled is to be maintained, temperature sensing means for sensing the temperature of the space and deriving a sensed temperature signal representative of the temperature of the space, and temperature control signal deriving means responsive to the temperature reference signal and the sensed temperature signal for deriving an output temperature error control signal that is supplied to the heat pump control logic circuit means, said heat pump control logic circuit means deriving an output set point reference control signal for supply to the resonant piston control logic means for use in controlling operation of said gas spring control valve means in response to the demands of the heat exchanger means.

13. A resonant piston compressor heat pump according to claim 2 wherein said compressor is part of a larger overall heat pump apparatus for performing a predetermined design function and the larger overall heat pump includes a central heat pump controller for supplying a resonant piston compressor control logic means comprising a part of the control circuit means, means providing an input demand control reference signal for controlling operation of the resonant piston compressor, said heat pump including heat exchanger means for dispensing heated/cooled air for maintaining the temperature of a climate controlled space within desired values, said heat exchanger means being supplied working fluid from the resonant piston compressor along with outside air to be heated/cooled, the heat pump controller further comprising a heat pump control logic circuit means for supplying operating control signals to the components of the heat pump, thermostat means including means for providing a temperature reference signal representative of a desired temperature at which the space being heated-cooled is to be maintained, temperature sensing means for sensing the temperature of the space and deriving an output temperature signal representative of the temperature of the space, and temperature control signal deriving means responsive to the temperature reference signal and the sensed temperature signal for deriving an output temperature error control signal that is supplied to the heat pump control logic circuit means, said heat pump control logic circuit means deriving an output operating set point reference control signal for supply to the resonant piston control logic means for coordinating operation of said resonant piston compressor with the operation of the heat pump.

14. A resonant piston compressor heat pump according to claim 13 wherein said control circuit means for the resonant piston compressor comprises a number of operating parameter sensors for sensing a plurality of different operating parameters of the resonant piston compressor and deriving output sensed signals representative of the respective parameters, means for combining the sensed parameter output signals to derive therefrom an output control signal and means for applying said output control signal to variably control the opening and closing of said gas spring control valve means; and wherein said control circuit means further includes alternating current sensing means for deriving a sensed output signal representative of the amplitude and phase of the alternating current supplied to the linear reciprocating motor, piston dislacement/velocity sensing means for deriving a signal representative of the resonant piston velocity, and said means for combining the sensed parameter output signals includes an $\alpha$ angle detector means responsive to the output from the alternating current sensing means and the resonant piston displacement/velocity sensing means for comparing the phase of the alternating current supplied to the linear reciprocating motor to the resonant piston displacement/velocity and deriving an output $\alpha$ angle control signal used to derive motor voltage control signals that control the magnitude of the voltage supplied to the A-C coils of the linear reciprocating motor.

15. A resonant piston compressor heat pump according to claim 14 wherein said linear reciprocating electrodynamic motor includes alternating current winding means and direct current winding means and said control circuit means further includes alternating current detector means responsive to the output from said alternating current sensing means for deriving an output signal representative of the magnitude of the alternating current, the output from said alternating current detector circuit means being supplied to said resonant piston compressor control logic means and direct current control and supply circuit means having its output coupled to the D-C field winding means of the reciprocating linear motor and controlled by an output direct current control signal derived from said resonant piston control logic circuit means for proportionally controlling the magnitude of the direct current supplied to said linear reciprocating motor D-C field winding in proportion to the magnitude of the alternating current supplied to the alternating current winding means of the linear reciprocating motor.

16. A resonant piston compressor heat pump according to claim 15 wherein said control circuit means further includes two level voltage supply relay circuit means for controlling the magnitude of the supply alternating current voltage to said linear reciprocating motor, said motor voltage relay circuit means being controlled by the resonant piston compressor control logic means in response to the $\alpha$ angle detector means whereby the magnitude of the alternating current supply voltage to the linear reciprocating motor is switched from a lower voltage value to a higher voltage value upon the $\alpha$ angle attaining a predetermined negative (lagging) value under conditions where the natural mechanical system resonant frequency is lower than the alternating current supply voltage frequency and the alternating current voltage to the linear reciprocating motor is switched to a lower voltage value in response to the $\alpha$ angle attaining a predetermined positive (leading) value relative to the alternating current supply voltage frequency.

17. A resonant piston compressor heat pump according to claim 16 further including two level stroke limit detector circuit means responsive to the output from said resonant piston displacement/velocity sensing means for comparing the resonant piston velocity to predetermined limit magnitudes, the output from said two level stroke limit detetor circuit means being supplied to said resonant piston compressor control logic means for providing the maintaining of piston stroke or the shutting down of the operation of the resonant piston compressor under conditions where the piston stroke magnitude attains levels which could cause inefficient compressor operation of could result in damage to the compressor.

18. A resonant piston compressor heat pump according to claim 17 further including motor temperature sensing means for sensing the temperature of the linear reciprocating motor and deriving an output temperature signal representative of the temperature value and motor temperature detector circuit means responsive to the output motor temperature signal for comparing the sensed motor temperature to a predetermined safe temperature limit and thereafter deriving an output motor temperature alarm signal for supply to said resonant piston control logic means to cause said resonant piston control logic means to shut down the compressor in the event that the motor temperature exceeds a predetermined safe limit value.

19. A resonant piston compressor heat pump according to claim 18 further comprising manually operated heat/cool switch control means and automatic/manual switch control means comprising a part of said thermostat means and coupled to said heat pump control logic circuit means for causing said heat pump to operate either in the heating or cooling mode.

20. A resonant piston compressor according to either of claims 13, 14, 15, 16, 17 or 18 further characterized by means communicating said gas spring means with a reservoir of gas at high pressure.

21. A resonant piston compressor according to either of claims 2, 3, 4, 5, 6, 7, 8, 9, 11, 12, 13, 14, 15, 16, 17, 18 or 19 wherein the selective communication of said gas spring control valve means with said gas spring means comprises porting means controlled by said piston.

22. A resonant piston compressor according to either of claims 2, 3, 4, 5, 6, 7, 8, 9, 11, 12, 13, 14, 15, 16, 17, 18 or 19, further including porting means communicating said gas spring means with a reservoir of gas at high pressure whenever said piston exceeds a predetermined maximum stroke position so that gas flows into said gas spring means to increase the pressure thereof.

23. A resonant piston compressor according to either of claims 2, 3, 4, 5, 6, 7, 8, 9, 11, 12, 13, 14, 15, 16, 17, 18 or 19 including a first porting means controlled by said piston for selectively communicating said gas spring control valve means with said gas spring means and a second porting means operative to communicate said gas spring means with a reservoir of gas at high pressure whenever said piston exceeds a predetermined maximum stroke position.

24. The method of controlling a resonant piston compressor of the type comprising an electrodynamic linear reciprocating motor adapted to be driven cyclically by an alternating current power source, at least one piston coupled to and adapted to be driven within a selectively valved working cylinder by said linear reciprocating motor in synchronism with the frequency of said alternating current power source, enclosed volumes of gas acting as resilient gas spring means coacting with said piston and with said linear reciprocating motor to form a mechanical resonant system having a resonant frequency substantially equal to the frequency of said alternating current power source, and means responsive to the position of the resonant piston for selectively communicating a gas spring control valve means with said gas spring means, said method comprising dynamically variably controlling with the gas spring control valve means the pressure of the gas in said gas spring means during operation of the mechanical resonant system to thereby dynamically control the stiffness of the resilient gas spring means in a manner to modulate the stroke of the resonant piston compressor within predetermined safe limits.

25. The method according to claim 24 further including sensing a plurality of different operating parameters of the resonant piston compressor and deriving output sensed signals representative of the respective parameters, combining the sensed parameter output signals to derive therefrom an output control signal and applying said output control signal to variably control the opening and closing of the gas spring control valve means that controls the pressure of the gas in the enclosed volumes comprising the resilient gas spring means.

26. The method of according to claim 25 comprising deriving a sensed output signal representative of the phase of the alternating current supplied to the linear reciprocating motor, deriving a signal representative of the resonant piston velocity, and comparing the phase of the alternating current supplied to the linear reciprocating motor to the reciprocating piston displacement/velocity to derive an output α angle control signal used to derive motor voltage control signals that control the magnitude of the voltage supplied to the A-C coils of the linear reciprocating motor and maintain the α angle between predetermined safe limits.

27. A method according to claim 26 further comprising deriving a number of additional resonant piston compressor sensed operating parameter signals and logically processing said α angle control signal together with the sensed parameter signals and overall controlling both the gas spring control valve means and the linear reciprocating motor in response to logically devised highest priority error, alarm or limit controlling signals.

28. A method according to claim 27 wherein the linear reciprocating electrodynamic motor includes alternating current windings and direct current field windings and the method further comprises controlling the magnitude of the voltage supplied to the alternating current windings, derving an A-C current signal representative of the magnitude of the A-C current supplied to the A-C windings and deriving from the A-C current signal an output direct current control signal for proportionally controlling the magnitude of the direct current supplied to said linear reciprocating motor direct current field winding in proportion to the current magnitude of the alternating current supplied to the alternating current windings of the linear reciprocating motor.

29. A method according to claim 28 wherein the magnitude of the supply alternating current voltage to said linear reciprocating motor automatically is switched from a lower voltage to a higher voltage value in response to the α angle attaining a predetermined negative (lagging) value under conditions where the natural mechanical RPC system resonant frequency is lower than the alternating current supply voltage frequency and automatically switching the alternating current voltage to the linear reciprocating motor to a lower voltage value in response to the α angle attaining a predetermined positive (leading) value relative to the alternating current supply voltage frequency.

30. The method according to claim 29 further comprising comparing the resonant piston displacement/velocity signal to predetermined resonant piston velocity limit magnitudes and providing the maintaining of piston stroke or the shutting down of the operation of the resonant piston compressor under conditions where the piston stroke magnitude attains levels which could cause inefficient compressor operation or could result in damage to the compressor, sensing the temperature of the linear reciprocating motor and deriving a motor temperature signal representative of the motor temperature value and comparing the sensed motor temperature signal to predetermined safe motor temperature limit values to derive an output motor temperature alarm signal for use in controlling operation of the compressor in the event that the motor temperature exceeds a predetermined safe limit value.

31. The method of controlling a resonant piston compressor according to claim 30 wherein said compressor is part of a larger overall apparatus which comprises a heat pump unit including heat exchanger means for dispensing heated/cooled air for maintaining the temperature of a climate controlled space within desired values with the heat exchange means being supplied working fluid from the resonant piston compressor along with outside air to be heated/cooled, heat pump control logic circuit means for supplying operation control signals to the heat exchanger means, a thermostat including means for providing a temperature reference signal representative of a desired temperature at which the space being heated/cooled is to be maintained, temperature sensing means for sensing the temperature of the space and deriving a sensed temperature signal representative of the temperature of the space, temperature control signal deriving means responsive to the temperature reference signal and the sensed temperature signal for deriving an output temperature error control signal; said method further comprising supplying the temperature error control signal to the resonant piston compressor as a set operating point control signal for coordinating operation of the resonant piston compressor with the operation of the heat pump heat exchanger, operating the heat pump automatically either in the heating or cooling mode together with the resonant piston compressor as an overall system whereby the resonant piston compressor operates as a load demand following system for supplying the heating/cooling load demand of the heat pump unit under almost all operating conditions except where response to such demand would endanger the resonant piston compressor in which event operation of the resonant piston compressor is maintained within safe limits at all times.

* * * * *